W. J. GALLAGHER.
POULTRY FEEDER.
APPLICATION FILED FEB. 3, 1913.
1,217,438.
Patented Feb. 27, 1917.
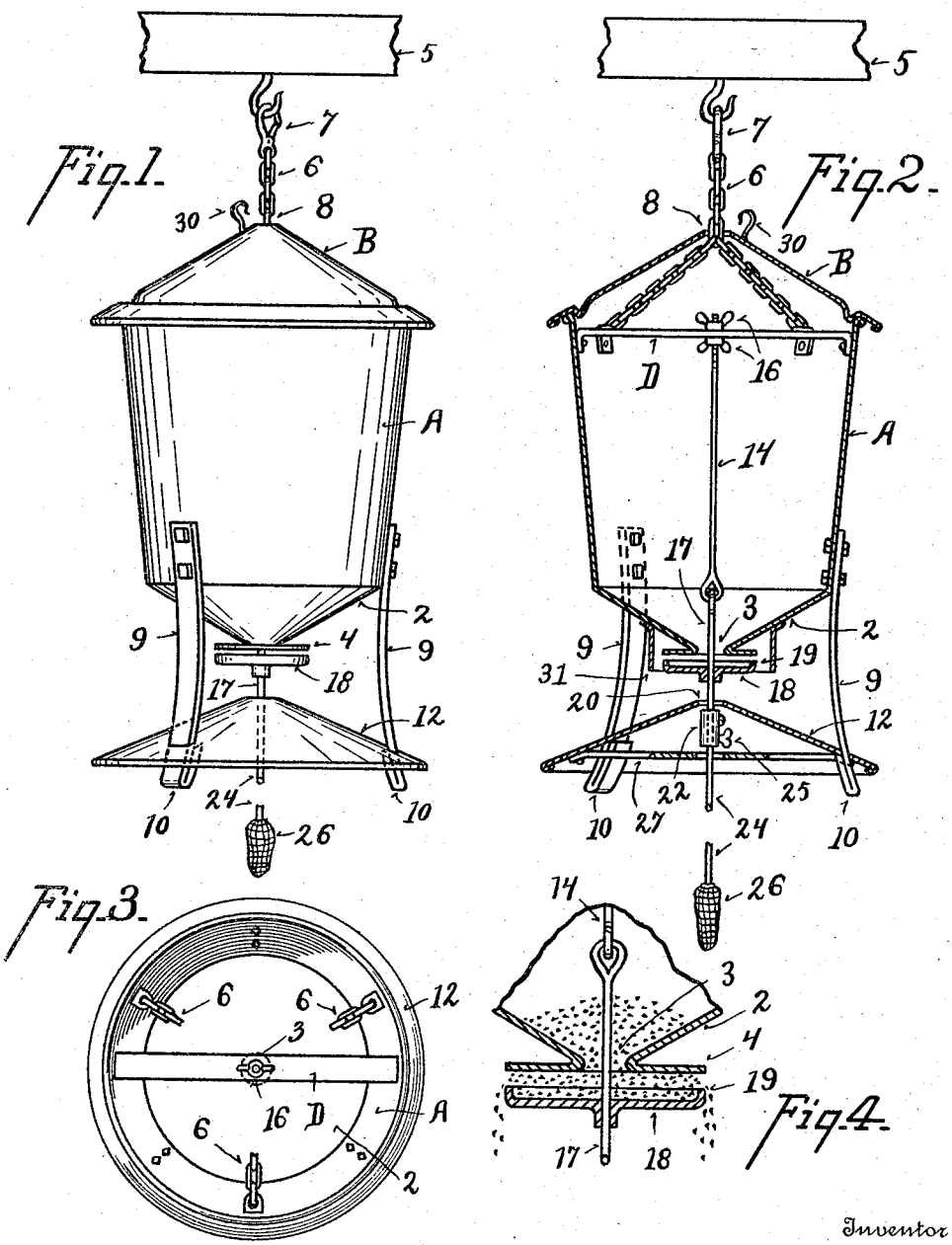

UNITED STATES PATENT OFFICE.

WALTER J. GALLAGHER, OF ANDERSON TOWNSHIP, HAMILTON COUNTY, OHIO.

POULTRY-FEEDER.

1,217,438.  Specification of Letters Patent.  Patented Feb. 27, 1917.

Application filed February 3, 1913. Serial No. 745,839.

*To all whom it may concern:*

Be it known that I, WALTER J. GALLAGHER, a citizen of the United States, residing at Anderson township, in the county of Hamilton and State of Ohio, have invented certain new and useful Improvements in Poultry-Feeders, of which the following is a specification.

My invention relates to improvements in poultry feeders and exercisers. One of its objects is to provide improved mechanism to reliably and regularly feed a variety of food substances to the poultry, and capable of being conveniently regulated for feeding different substances and in different quantities. Another object is to provide such a feeder capable of being conveniently handled in order to recharge it with food, or when not in use for feeding purposes. My invention also comprises certain details of form, combination and arrangement, all of which will be fully set forth in the description of the accompanying drawings in which:

Figure 1 is a side elevation of my improved feeder and exerciser in position for use.

Fig. 2 is a central vertical section through the same.

Fig. 3 is a top plan view with the lid removed.

Fig. 4 is a sectional detail.

The accompanying drawings illustrate the preferred embodiment of my invention, in which A represents a sheet metal container having a hopper shaped bottom 2 with a central orifice 3 and a substantially horizontal disk 4 encircling said orifice.

The container A is preferably dependently supported from above, as for instance from one of the roof timbers 5 by means of a chain 6 and hook or snap-hook 7, said chain branching to three or more points of attachment inside the upper edge of the container. A lid B with a central perforation 8 for the passage of the chain, seats upon the upper edge of container A to prevent access by mice or rats to the contents. D represents a light metal strap or cross bar inside and below the upper edge of the container from which the feeding mechanism is supported and adjusted.

Detachably secured to the lower portion of the container are three bars 9 with their lower ends 10 bent back upon themselves. These bars 9 serve as feet to support the container when it is desired to set it down upon the floor, and also serve as a support for a conical sheet metal spreader 12, which is held in place by passing the bars 9 upwardly through perforations in the spreader until the enlarged ends 10 engage the under face of the spreader and then attaching the bars 9 to the container.

The feeding mechanism comprises in addition to the orifice 3 and disk 4, the following: A rod 14 having an eye 15 at its lower end and threaded at its upper end so as to pass through an opening in the cross bar D and be vertically adjustable relative to said cross bar by means of nuts 16, which also serve to lock said rod to its adjusted position. A rod 17 jointedly connected to and hanging loosely from the rod 14 through the feed orifice 3. The rod 17 carries a disk 18 preferably with an upturned outer edge 19, and after passing through a central orifice 20 in the spreader preferably terminates slightly above the lower end of the feet 10 in a coupling member 22 to which an extension rod 24 is detachably coupled by means of a thumb screw 25 which locks the rod 24 in a recess or socket in the coupling member 22. At the lower end of the rod 24 is attached an ear of corn, a corn cob or other object 26 in position for the fowls to strike it with their beaks when hungry to actuate the feeding mechanism. I also preferably provide a light cross bar 27 beneath and attached to the spreader, and through a perforation in which the rod 24 passes to limit its movement.

In operation, the container being charged with a granular food, a portion of it feeds through the orifice 3 onto the disk 18 where it rests practically filling the space between the disks 4 and 18. The disk 18 may be adjusted to and from disk 4 according to the character of feed or the amount to be fed, by adjusting the rod 14 by means of nuts 16. The rod 17, disk 18, coupling 22, rod 24, and bait 26, all hang pendulously from the eye 15 of rod 14, being limited in their movement by the size of the orifice in cross bar 27, and free to move in any direction, also rod 14 while held rigidly to the cross bar D, due to its flexibility permits the eye 15 to vibrate. Any force applied to the bait 26 causes disk 18 to vibrate and a portion of the feed to work outwardly or radially between the disks 4 and 18 and fall upon the spreader 12 which deflects it and scatters it upon the floor. Vibration is also imparted to the rod 17 in and above the orifice 3 which insures an even and regular feed through the orifice 3 to take the place of that which has escaped from between the disks 4 and 18. Any tendency for an excessive or irregular amount to feed from or over the disk 18 is prevented by its upturned edges and its close proximity to disk 4.

When it is desired to refill the container, or when it is not required for feeding purposes, the rod 24 is detached, and the hook 7 released when the container may be placed upon its feet 10 upon the floor, or taken to and set down beside the feed bin to be refilled. The lid may be removed by passing the end of the chain through the opening therein, and the chain serves as a handle to carry the container from place to place. The ability to set the container upon the floor without injury to the feeding mechanism is an important advantage also being able to adjust the feed from above at any time whether the hopper is filled or not.

It is sometimes desirable to refill the container without removing it from its suspended position, in which event an extra length of chain is interposed between the container and the support 5 which enables the lid B to be lifted vertically as far as may be necessary to give access to the container and then suspended in that position from the chain by means of a hook 30 or similar member until the container has been refilled when the lid may be replaced upon the container.

Where the feeder is exposed to the attacks of mice and sparrows or other birds, I preferably provide a cylindrical sheet metal member 31, see Fig. 2, detachably supported from the container and encircling the members 4 and 18 to act as a guard to prevent attacks upon the feed exposed between edges of said members 4 and 18.

The mechanism herein illustrated and described is capable of considerable modification without departing from the principle of my invention.

Having described my invention what I claim is:

1. A poultry feeder comprising a feed container having a feeding orifice, means to suspend said container from above in operative position, feet to support said container in an upright position to be charged with feed, mechanism above said feet to release the feed, and a detachable baited member extending below said feet to actuate the feed releasing mechanism.

2. A poultry feeder comprising a feed container having a feeding orifice, means to suspend said container in operative position, downwardly projecting feet to support said container in an upright position to be charged with feed, a feed deflector carried rigidly beneath said container by said feet, mechanism above said feet to release the feed having a depending actuating rod limited in its movements by said deflector, and a baited member extending below said feet and deflector and detachably connected to said rod.

3. A poultry feeder comprising a container having a feeding orifice in its bottom, feeding mechanism to be actuated by the fowls located below said orifice to receive and intermittently distribute the feed, a flexible supporting member attached at a plurality of points to the upper and inner wall of said container to suspend said container in position for use, and a lid for said container fitted thereto and through an orifice in which said flexible supporting member passes.

4. A poultry feeder comprising a container having a feeding orifice in its bottom, feeding mechanism to be actuated by the fowls located below said orifice to receive and intermittently distribute the feed, a flexible supporting member attached at a plurality of points to the upper and inner wall of said container to suspend said container in position for use, and a lid for said container fitted thereto and through an orifice in which said flexible supporting member passes, said flexible supporting member also serving as a handle for said container to transport it from place to place.

5. A poultry feeder comprising a container to be normally held in a suspended position and having a feeding orifice through its bottom, means to support said container from below when not suspended from above, mechanism intermediate of said container and its lower support to intermittently discharge feed through said orifice, and a detachable baited rod extending below the lower end of said lower supporting means to actuate said discharge mechanism.

6. A poultry feeder comprising a container having a feeding orifice through its bottom, mechanism operable by a baited member to control the discharge of feed from said container, a spreader below said container, means to hold said container in a suspended position when in operation, means below said container to support said container when not in operative position, and a baited member detachably connected to said feed controlling mechanism and extending below said lower supporting means.

7. A poultry feeder comprising a container having a feed discharge orifice and a baited member to intermittently discharge feed through said orifice, a flexible suspending member attached to the inside of said container, a lid for said container having a perforation for the passage of said suspending member, and means to hold said lid on said flexible suspending member suspended above said container when access to the container is desired.

8. A poultry feeder comprising a feed container having a feed orifice, means to release the feed through said orifice, mechanism to suspend said container in operative position, downwardly projecting feet to support said container in an upright position to be charged with feed, a depending rod baited to actuate said feed releasing means, and means carried stationarily relative to said container to engage said depending rod below the feed releasing means to limit the pendulous movement of said rod and a baited member extending below said feet and detachably connected to said rod.

In testimony whereof I have affixed my signature in presence of two witnesses.

WALTER J. GALLAGHER.

Witnesses:
JAS. GALLAGHER,
C. W. MILES.

Copies of this patent may be obtained for five cents each, by addressing the "Commissioner of Patents, Washington, D. C."